United States Patent [19]

van der Lely

[11] 4,219,086
[45] Aug. 26, 1980

[54] SOIL CULTIVATING IMPLEMENTS

[76] Inventor: Cornelis van der Lely, Brüschenrain 7, Zug, Switzerland

[21] Appl. No.: 884,202

[22] Filed: Mar. 7, 1978

[30] Foreign Application Priority Data

Mar. 7, 1977 [NL] Netherlands .......................... 7702396
Mar. 7, 1977 [NL] Netherlands .......................... 7702397

[51] Int. Cl.² ............................................. A01B 33/06
[52] U.S. Cl. ........................................................ 172/59
[58] Field of Search ................. 172/59, 111, 523, 526, 172/522, 169, 52

[56] References Cited

U.S. PATENT DOCUMENTS

| 75,578 | 3/1868 | Roberts | 172/59 |
|---|---|---|---|
| 661,309 | 11/1900 | Darby | 172/59 |
| 1,697,677 | 1/1929 | Davidson | 172/59 |
| 2,755,718 | 7/1959 | Arndt | 172/42 |
| 3,931,859 | 1/1976 | Lely | 172/247 |
| 4,055,221 | 10/1977 | Lely | 172/96 |

FOREIGN PATENT DOCUMENTS

| 2401637 | 7/1974 | Fed. Rep. of Germany | 172/59 |
|---|---|---|---|
| 524437 | 5/1921 | France | 172/59 |
| 2124135 | 9/1972 | France | 172/123 |
| 2274207 | 1/1976 | France | 172/59 |
| 459297 | 1/1937 | United Kingdom | 172/59 |
| 565644 | 8/1977 | U.S.S.R. | 172/28 |

Primary Examiner—Richard J. Johnson
Attorney, Agent, or Firm—Mason, Mason and Albright

[57] ABSTRACT

An implement has rotatable soil working members that are driven to rotate about upwardly extending axes. The members each have a downwardly extending carrier that is releaseably connected to a driven shaft, and spaced apart soil working elements mounted along the length of the carrier. The elements are spaced apart by spacing pieces and the lower elements are fastened to their respective carriers by one or more bolts that pass through the lower pieces. At least one element, preferably the lowermost element, has obliquely extending portions that exert upward pressure on the soil being worked at different levels.

6 Claims, 7 Drawing Figures

SOIL CULTIVATING IMPLEMENTS

According to one aspect of the invention, there is provided a soil cultivating implement of the kind set forth, wherein the element, or at least one of the elements, of a soil working member is of elongate configuration and is fastened, at a location between its ends, to the lower end of at least one piece which embodies the axis of rotation of the soil working member concerned, said element comprising at least one portion which is in obliquely inclined relationship with said axis of rotation.

Figure 1:
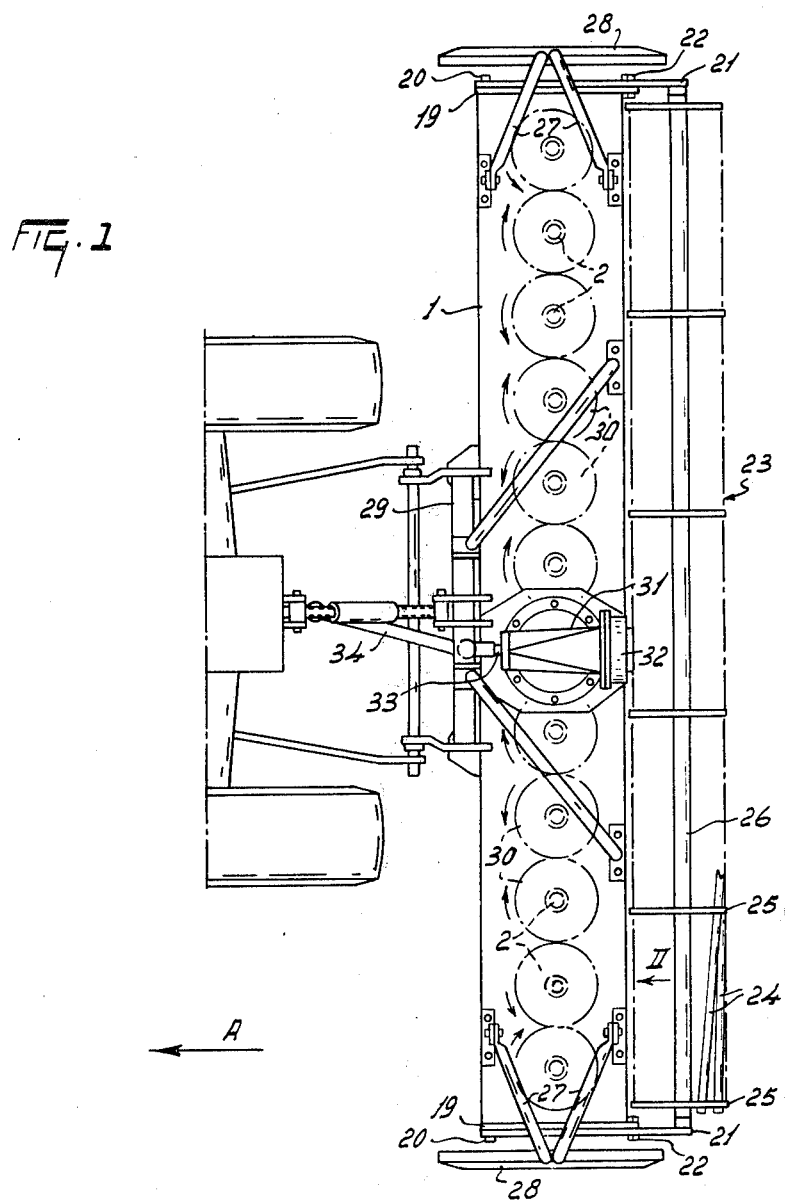
Figure 2:
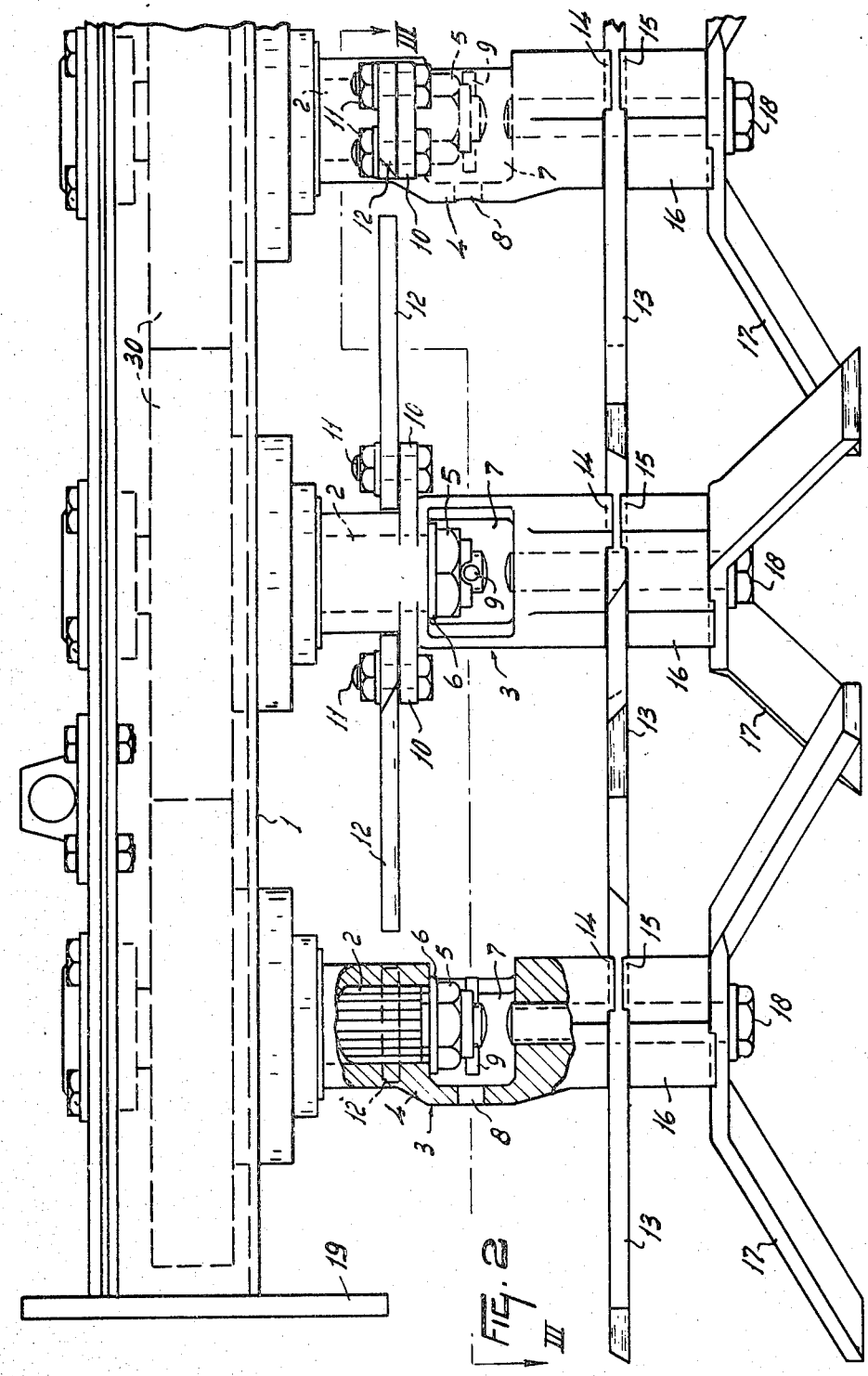
Figure 3:
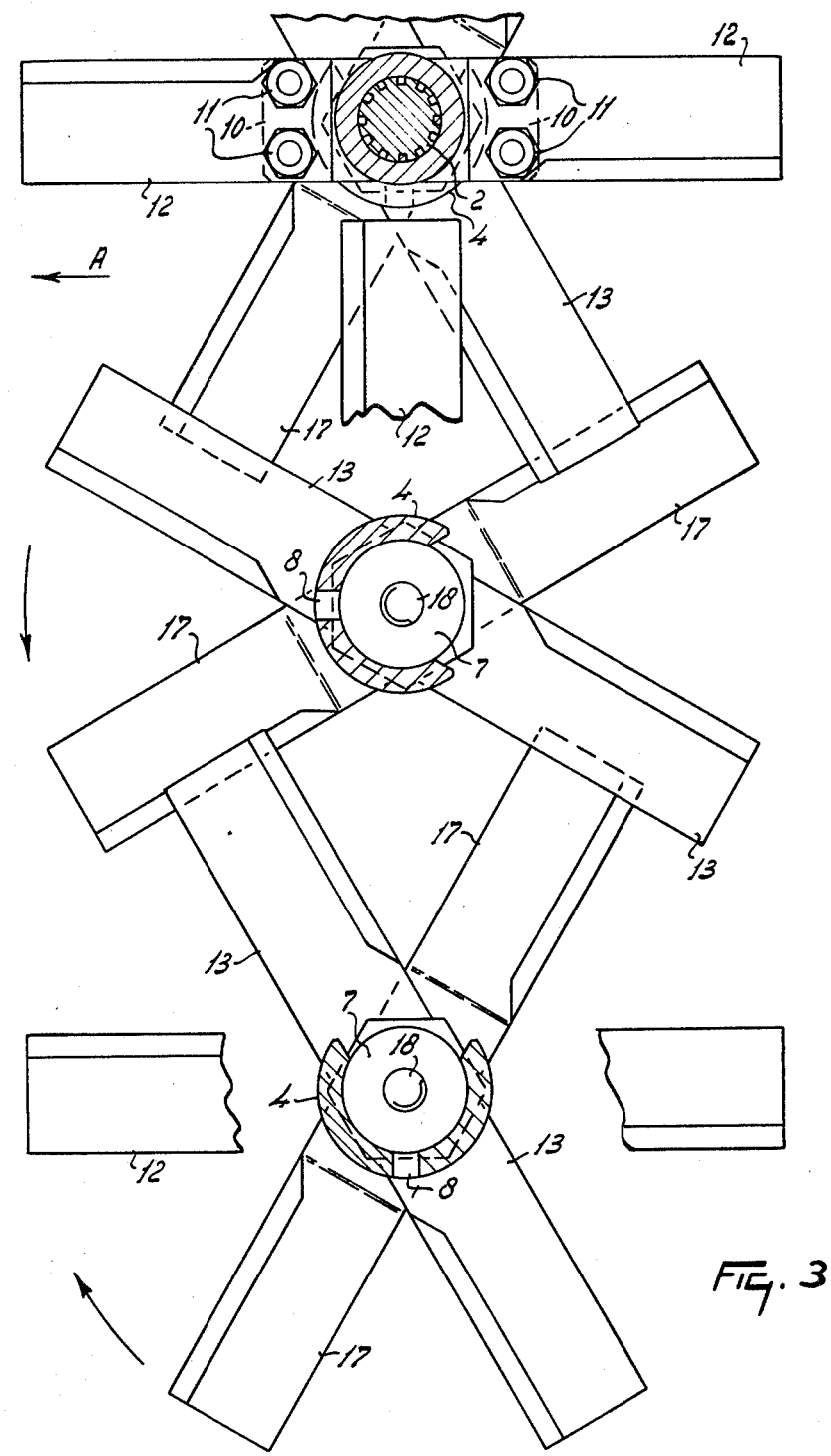
Figure 4:
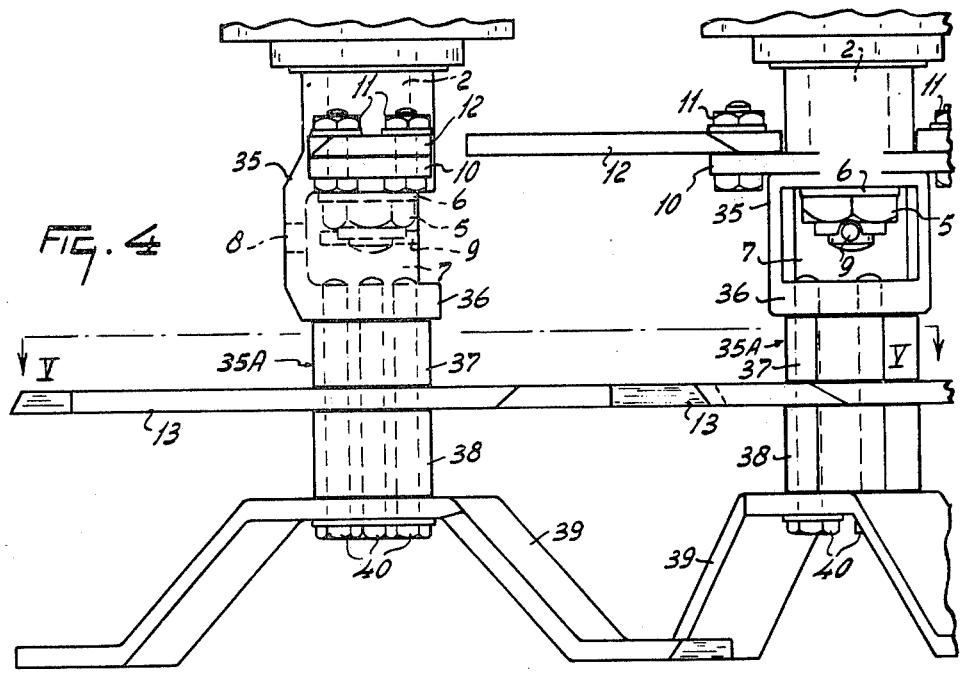
Figure 5:
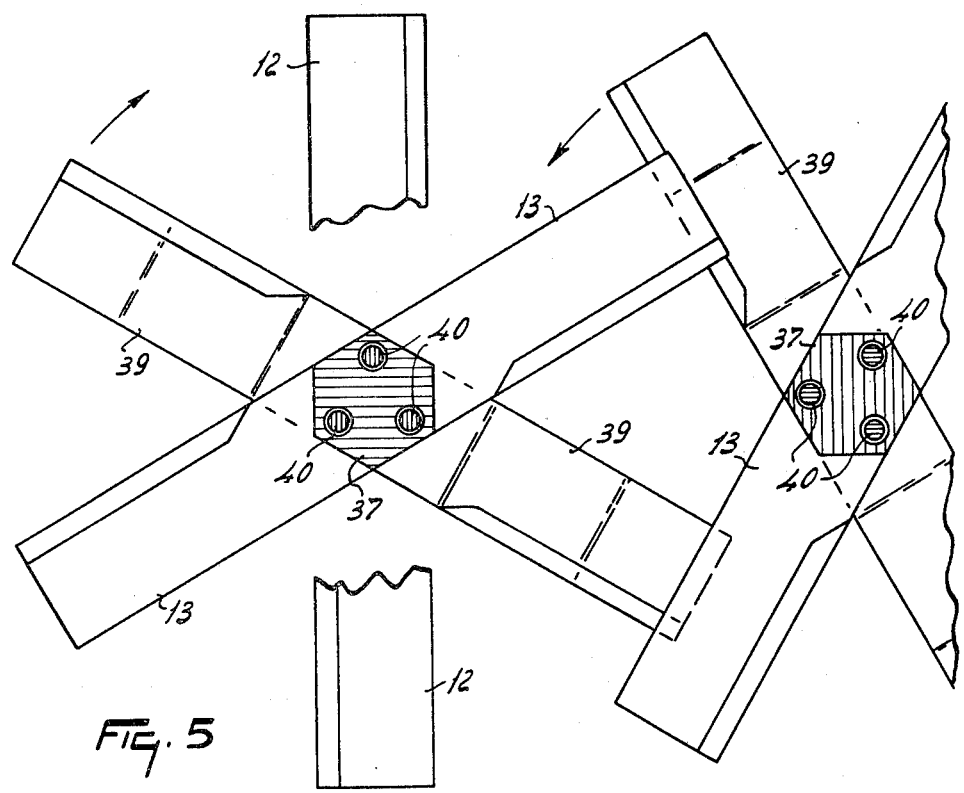
Figure 6:
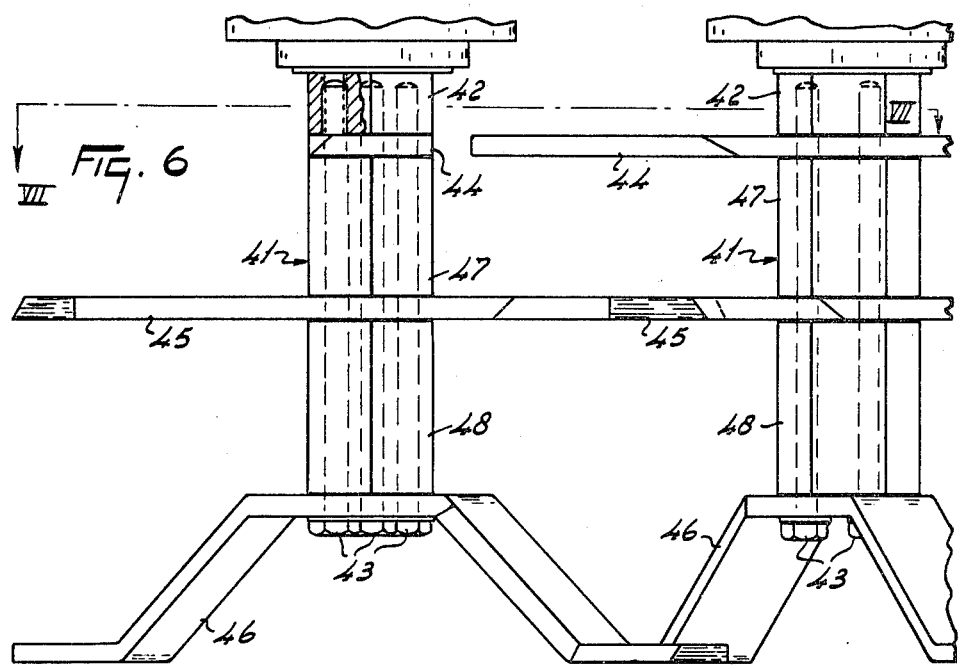
Figure 7:
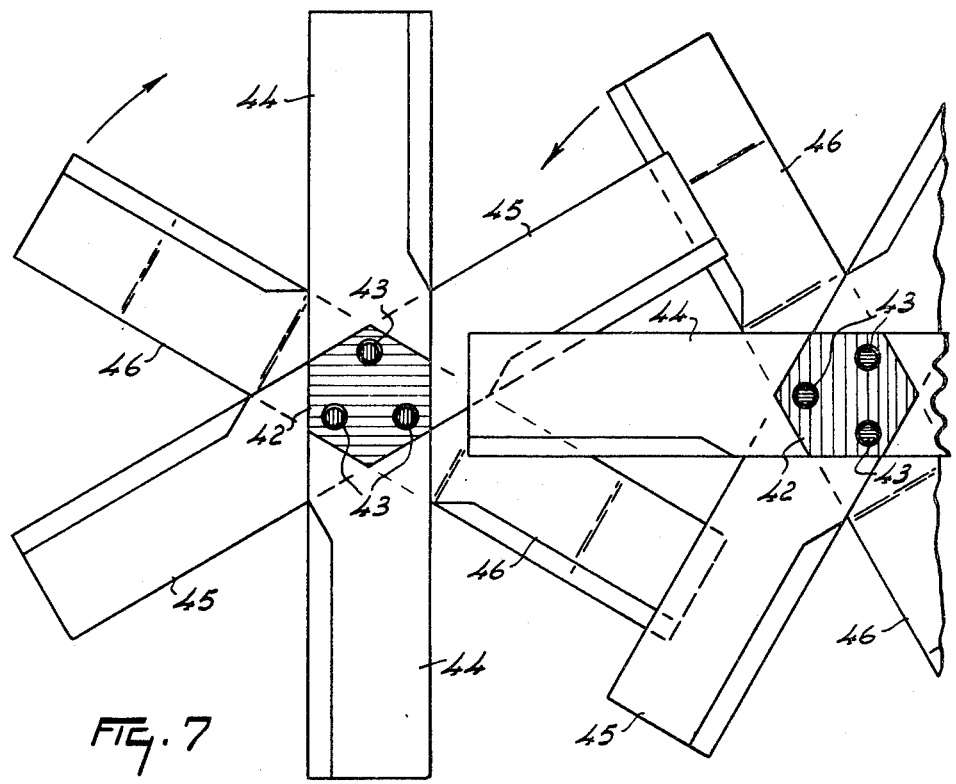

For a better understanding of the invention, and to show how the same may be carried into effect, reference will now be made, by way of example, to the accompanying drawings, in which:

FIG. 1 is a plan view of a soil cultivating implement in accordance with the invention connected to the rear of an agricultural tractor, FIG. 2 is a part-sectional elevation, to an enlarged scale, as seen in the direction indicated by an arrow II in FIG. 1 and illustrates the construction and arrangement of three neighbouring soil working members of the implement, FIG. 3 is a section taken on the line III—III in FIG. 2, FIG. 4 is an elevation which is similar to that of FIG. 2 but which shows the construction and arrangement of two neighbouring soil working members that are of an alternative construction, FIG. 5 is a section taken on the line V—V in FIG. 4, FIG. 6 is a further elevation that is similar to FIGS. 2 and 4 but that illustrates two neighbouring soil working members that are of a further alternative construction, and FIG. 7 is a section taken on the line VII—VII in FIG. 6.

Referring to FIGS. 1 to 3 of the drawings, the soil cultivating implement that is illustrated therein has a hollow box-section frame portion 1 which extends substantially horizontally transverse, and usually (as illustrated) substantially perpendicular, to the intended direction of operative travel of the implement which is indicated by an arrow A in FIGS. 1 and 3 of the drawings. A plurality of parallel and substantially vertical, or at least non-horizontally extending, shafts 2 are rotatably mounted in the hollow frame portion 1 in a single row, the axes of rotation (longitudinal axes) of the shafts 2 being spaced apart from one another at regular intervals which should not be greater than 300 millimeters and which it is preferred should have magnitudes of substantially 250 millimeters. It is noted that, in the embodiment which is being described by way of example, there are eight of the shafts 2, each shaft 2 having a corresponding soil working member that is generally indicated by the reference 3 mounted at its lowermost end which projects downwardly from beneath the bottom of the hollow frame portion 1. However, it is emphasised that this number of shafts 2 and soil working members 3 is by no means mandatory and that either a greater or a lesser number of shafts 2 and soil working members 3 could equally well be provided in other embodiments. The lower end of each shaft 2 that projects downwardly from beneath the bottom of the hollow frame portion 1 is externally splined and co-operates with the internally splined sleeve-like upper end of a corresponding support or carrier 4 whose longitudinal axis substantially coincides with that of the shaft 2 concerned. Each shaft 2 has a short screwthreaded lowermost end part and the upper end of the corresponding support or carrier 4 is prevented from becoming axially disengaged from the shaft 2 under consideration by tightening a fastening nut 5 and a co-operating washer 6 onto said screwthreaded end part of the shaft 2. In order to enable access to be had to the nuts 5, the supports or carriers 4 are formed, below their internally splined upper ends, with corresponding internal chambers 7. Each chamber 7 is formed with a lateral opening which subtends an angle of substantially 90° around the longitudinal axis of the support or carrier concerned, said opening also having a significant length in a direction parallel to that axis. It is thus readily possible for a spanner or wrench to be passed into the opening to tighten or loosen the fastening nut 5 concerned. The substantially cylindrical portion of each support or carrier 4 in which the corresponding internal chamber 7 is formed is of somewhat bulging or enlarged shape as compared with the remainder of that support or carrier 4 and it will be noted that the bulging wall of each chamber 7 is formed, centrally opposite to the access opening for the corresponding nut 5, with a hole 8 through which access may be had, for installation and removal purposes, to a split pin 9 or other retaining pin which co-operates with the screwthreaded lowermost end part of the shaft 2 concerned in positively preventing the associated fastening nut 5 from working loose when the implement is in operation.

Each support or carrier 4 is provided, immediately above the corresponding chamber 7, with two radially projecting and diametrically opposed lugs 10 to which the ends of two straight strip-formation soil working elements 12 are frimly but releasably fastened by corresponding pairs of bolts 11, the arrangement being such that each element 12 projects radially away from its support or carrier 4 in the opposite direction to the companion element 12 of the pair. Each support or carrier 4 comprises a portion which extends downwardly from beneath the lower end of the corresponding chamber 7, said portion having a plygonal cross-section which, as illustrated, is advantageously a regular hexagonal one. The length of that part/portion of each support or carrier 4 which extends downwardly to the level of the lowermost end of the chamber 7 therein is not less than equal, or substantially equal, to the length of the portion of the same support or carrier 4 that extends downwardly from the level of the bottom of said chamber 7 to the lowermost extremity thereof. The downwardly facing extreme lower end of each support or carrier 4 is formed with a shallow recess which has, at two opposite sides of the hexagonal cross-section, downwardly directed rims 14 and a single strip-formation soil working element 13 has its central portion, which is formed with a hole, engaged between said two rims 14 so as not to be turnable relative to the overlying support or carrier 4. A spacing piece 16 which has the same regular hexagonal cross-section as does the lower portion of the overlying support or carrier 4 is arranged immediately beneath that lower portion and, at its upper end, is formed with a shallow recess that is bounded at two opposite sides by upwardly directed rims 15 which rims are arranged to register with the corresponding downwardly directed rims 14 so that the straight soil working element 13 of each member 3 is received in the opposed recesses between the lower end of the support or carrier 4 concerned and the upper end of the respective spacing piece 16. The rims 14 and 15 are closely spaced apart from one another, as illustrated in the drawings, or may even contact one another.

The lower end of each spacing piece 16 is, like the upper end thereof, formed with a shallow recess which has downwardly directed rims at two of its opposite sides but it will be noted from the drawings that the rims at the lowermost end thereof are angularly displaced by 60° about the upright longitudinal axis of the spacing piece 16 concerned from the upwardly directed rims 15 which are at the upper end thereof. Each spacing piece 16 is formed with a central upwardly extending axial bore which registers with a screwthreaded bore through the lower portion of the overlying support or carrier 4 and it will be seen from FIGS. 2 and 3 of the drawings that a central portion of a lower strip-shaped soil working element 17 is engaged in the recess at the bottom of each spacing piece 16, between the opposed rims of that recess, and that the whole assembly of parts 13, 16 and 17 is clamped firmly but releasably to the lower portion of the corresponding support or carrier 4 by a bolt 18, provided with a washer, the shank of the bolt 18 being entered upwardly from the lowermost end of said assembly through a hole in the central portion of the soil working element 17, the axial bore in the spacing piece 16 and the central hole in the straight soil working element 13, the shank of said bolt 18 then being screwed into the matchingly screwthreaded axial bore in the lower portion of the co-operating support or carrier 4. The central portion of each lower soil working element 17 is straight and extends parallel or substantially parallel to planes which contain the corresponding elements 12 and 13, said planes being perpendicular or substantially perpendicular to the axes of rotation of the members 3 concerned. However, the opposite ends of the fastened central portion of each lower soil working element 17 are bent over obliquely downwards through angles which may conveniently have magnitudes of substantially 30°. Each element 17 thus has two symmetrically similar downwardly and outwardly inclined portions, both of which are straight. All of the elements 12, 13 and 17 are made from a resilient strip-formation material which advantageously has a width of substantially 60 millimeters and a thickness of substantially 10 millimeters. Each spacing piece 16 advantageously has an axial length which is substantially the same as the width (preferably 60 millimeters) of one of the elements 12, 13 or 17. The broad surfaces of the strip-formation elements are all non-vertically disposed and it will become apparent below that the implement is usually operated with the axes of rotation of its soil working members 3 somewhat inclined to the vertical so that, generally speaking, the broad surfaces of the elements 12, 13 and 17 will be in obliquely inclined relationship with the vertical rather than being substantially horizontally perpendicular thereto. The elements 12, 13 and 17 have lengths in radial directions from the axes of rotation of the corresponding soil working members 3 which are such that, as will be evident from FIG. 3 of the drawings, the circular paths which are traced by the outer ends of said elements during rotation of said members 3 overlap one another to a very considerable extent. The outer ends of all of the strips are at the same distance from the corresponding axis of rotation and it will therefore be realised that, due to its bent formation, each lower element 17 is formed from a strip whose initial length is a little greater than that of the corresponding strip 13. As seen in FIG. 3 of the drawings, the element 12, 13 and 17 project from the axis of rotation of the corresponding soil working member 3 at regular substantially 60° intervals around that axis. It will, of course, be realised that the soil working members 3 are so arranged that their elements, such as the central elements 13, are angularly staggered around the corresponding axes of rotation as regards neighbouring soil working members 3 in the row thereof so that said elements will not foul one another during their rotation in the directions that are indicated by arrows in FIGS. 1 and 3 of the drawings. The leading edges of the elements 12, 13 and 17, with respect to the intended direction of operative rotation which have just been mentioned, are bevelled to form cutting edges throughout the greater parts of their lengths, only short innermost parts thereof which are close to the corresponding axes of rotation being unbevelled. It will also be noted from FIG. 2 of the drawings that the outer ends of the central and lower elements 13 and 17 are also bevelled to form cutting edges.

The opposite ends of the hollow box-section frame portion 1 are closed by substantially sector-shaped side plates 19 which are substantially vertically parallel to one another and parallel or substantially parallel to the direction A. Substantially horizontally aligned pivots 20 are mounted close to the fronts of the side plates 19, with respect to the direction A, and two arms 21 which extend generally rearwardly from said pivots 20 with respect to the direction A are turnable upwardly and downwardly about those pivots alongside the corresponding plates 19. Rear curved edges of the substantially sector-shaped side plates 19 project short distances behind the back of the remainder of the hollow frame portion 1, with respect to the direction A, and said edges are formed with curved rows of holes, the holes in said rows being equidistant from the substantially horizontal axis which is defined by the pivots 20. The arms 21 are formed with holes at the same distance from said axis as are the holes in the rear edge regions of the side plates 19 and the holes in said arms 21 can be brought into register with chosen ones of the holes in the side plates 10 by turning said arms 21 upwardly or downwardly, as may be required, alongside the plates 19. Chosen angular positions of the arms 21 about the axis which is defined by the pivots 20 are very firmly but releasably maintained by entering bolts 22 through the holes in the arms 21 and the chosen holes in the rear edge regions of the corresponding side plates 19. The arms 21 project some distance behind the side plates 19 with respect to the direction A and their rearmost ends carry substantially horizontally aligned bearings between which a rotatable supporting member of the implement, afforded by an open-work cage formation ground roller 23, is mounted in a freely rotatable manner. It will be seen from FIG. 1 of the drawings that the roller 23 extends throughout the combined working width of the twelve soil working members 2 and that is comprises a central axially extending support or carrier 26, which is preferably of tubular formation, to which support or carrier 26 are secured a plurality, such as six, of support plates 25, said support plates 25 being spaced apart from one another at regular intervals along the support or carrier 26 with two of them disposed close to the opposite ends of that support or carrier. The support plates 25 are circular or substantially circular in shape and are vertically disposed in parallel relationship with one another and parallel or substantially parallel relationship with the direction A. Each plate 25 is formed close to its circumference, with a curved row of holes, the holes in said row being spaced apart from one another at regular angular intervals around the longitudinal axis of the central support or carrier 26. A plurality of elongate elements 24 are entered lengthwise through the holes in the successive plates 25 and are preferably so arranged that, as can be seen in FIG. 1 of the drawings, they extend helically around the support or carrier 26. The elements 24, together with circumferential edge regions of the support plates 25, afford the skeletal cylindrically curved groundengaging surface of the roller 23. The elements 24 are of either solid rod-shaped or tubular formation.

Two brackets are mounted at the front and rear edges (with respect to the direction A) of the top of the hollow frame portion 1 at locations which are short distances inwardly towards the centre of said frame portion from the side plates 19 which are at the opposite ends thereof. The two brackets of each pair (one of which brackets can be seen in elevation in FIG. 2) carry corresponding pivot pins which define axes that are substantially horizontally parallel to the direction A. The ends of two arms 27 are freely turnable about the two pivots of each pair, said arms 27 extending from the corresponding pair of pivots, in convergent relationship, towards, and over, the neighbouring frame portion side plate 19 where they are bent over downwardly and have a corresponding substantially vertically disposed shield plate 28 secured to them. The two shield plates 28 are parallel or substantially parallel to one another and to the direction A and their lower edges are shaped to slide forwardly over the ground surface during operative progress in the direction A, and also rearwardly with respect to that direction during manoeuvring. The shield plates 28 co-operate with the two soil working members 3 which are at the opposite ends of the row thereof in ensuring that the soil in opposite edge regions of the broad strip of land that is worked by the implement is as well cultivated as is soil which is nearer the middle of said broad strip. Ridging at the edges of the broad strip of land is also reduced by the provision of the shield plates 28 and said shield plates act to prevent stones and other hard objects from being flung laterally of the path of travel of the implement by its rapidly rotating soil working members 3 with a consequent reduction in the danger of injury or damage to bystanders, property and so on. The shield plates 28 can follow undulations in the surface of the ground which the implement may meet during its progress in the direction A by turning upwardly and downwardly, as may be required, about the axes which are defined by the pivotal connections of the respective pairs of arms 27 to the brackets that are mounted on top of the hollow frame portion 1. The front of the hollow frame portion 1, with respect to the direction A, is provided with a coupling member or trestle 29 which is of substantially triangular configuration as seen in front or rear elevation, said coupling member or trestle 29 being located substantially midway between the general planes of the two frame portion side plates 19. Coupling points at the top of the member or trestle 29 and at the opposite ends of the bottom thereof can be employed, in a manner that is generally known per se and that is illustrated somewhat diagrammatically in FIG. 1 of the drawings, in connecting the implement to the three-point lifting device or hitch at the rear of an agricultural tractor or other operating vehicle.

Each of the twelve shafts 2 is provided, inside the hollow frame portion 1, with a corresponding straight-toothed or spur-toothed pinion 30, the pinions 30, like the soil working members 3, being arranged in a single row and their sizes being such that the teeth of each of them are in mesh with those of the or each immediately neighbouring pinion 30 in said row. It is, of course, this intermeshing relationship of the pinions 30 that causes each such pinion, together with the corresponding shaft 2 and soil working member 3, to be rotated in the opposite direction to the or each immediately neighbouring similar assembly when the implement is in use. One of the center pair of shafts 2 of the row of twelve such shafts has an upward extension through the top of the hollow frame portion 1 into a gear box 31 that is secured in position on top of the hollow frame portion 1. Bevel pinions (not visible) within the gear box 31 place the upward shaft extension which has just been mentioned in driven connection with a shaft (not visible) which extends substantially horizontally parallel to the direction A. The rear end of this substantially horizontal shaft and the rear end of an overlying and parallel substantially horizontal shaft 33 both project through the back of the gear box 31 into a change-speed gear 32 that is provided at the rear of the gear box 31 with respect to the direction A. The ends of the two parallel and relatively spaced horizontal shafts that project into the change-speed gear 32 both splined to receive the matchingly splined hubs of a chosen pair of co-operating straight-toothed or spur toothed pinions of different sizes. Preferably, at least two such exchangeable pairs of co-operating pinions of different sizes are provided, the two pinions of each pair being interchangeable in position on the two shaft ends. It will be appreciated that the particular pair of pinions which is chosen for use in the change-speed gear 32, and the arrangement thereof which is adopted on the shaft ends in that change-speed gear, dictates the transmission ratio between the shaft 33, which serves as a rotary input shaft, and the underlying and parallel shaft which is not visible in the drawings. Thus, the speed at which all of the soil working members 3 are revolved can be increased or decreased, as may be desired, without it being necessary to change the substantially constant speed of input rotation which is applied to the shaft 33. As will be evident from FIG. 1 of the drawings, the leading end of the shaft 33, with respect to the direction A, projects forwardly in substantially that direction from the front of the gear box 31 where it is splined or otherwise keyed to enable it to be placed in driven connection with the rear power take-off shaft of an agricultural tractor or other operating vehicle by way of an intermediate telescopic transmission shaft 34, which is of a construction that is known per se, having universal joints at its opposite ends.

In the use of the soil cultivating implement that has been described with reference to FIGS. 1 to 3 of the accompanying drawings, its coupling member or trestle 29 is connected to the three-point lifting device or hitch at the rear of an agricultural tractor or other operating vehicle and the forwardly projecting splined or otherwise keyed end of the rotary input shaft 33 is placed in driven connection with the rear power take-off shaft of the same tractor or other operating vehicle by way of the known telescopic transmission shaft 23 that has universal joints at its opposite ends. Adjustments which may, if necessary, need to be made before work commences include setting the maximum depth to which the soil working members 3 will be able to penetrate into the ground by moving the roller 23 either bodily upwards or downwards relative to the hollow frame portion 1, employing the bolts 22 in the manner that has been described above to maintain any chosen level of the roller 23 relative to the frame portion 1 as long as may be required. The upper lifting link of the three-point lifting device or hitch of the tractor or other operating vehicle to which the coupling member or other operating vehicle to which the coupling member or trestle 29 is connected will, as illustrated in FIG. 1 of the drawings, almost always be adjustable in length and the length thereof will, for almost all operations, be so adjusted, before work commences, that the longitudinal axes (axes of rotation) of the twelve shafts 2 will be inclined to the strictly vertical by at least a few degrees in such a way that the upper ends of said shafts 2 are a little further advanced with respect to the direction A than are the lowermost ends thereof. As the implement moves forwardly in the direction A over land that is to be cultivated, the drive that is applied to the rotary input shaft 33 causes the pinions 30, shafts 2 and soil working members 3 to revolve in the directions that are indicated by arrows in FIGS. 1 and 3 of the drawings, the speed of such rotation, in response to a substantially "standard" speed of input rotation applied to the shaft 33, being dependent upon the particular four of pinions which is employed in the change-speed gear 32 and the arrangement of that pair of pinions on the two shaft ends thereof. A s has previously been discussed, the strips of soil that are worked by the twelve individual members 3 overlap one another to a very considerable extent (see FIG. 3) so that a single broad strip of cultivated soil results, said broad strip having a width of substantially 3 meters with the preferred spacing between the axes of rotation of the shafts 2 that has been discussed above. Each soil working member 3 has spaced superposed soil working elements 12, 13 and 17 at three different levels and, since the axis of rotation thereof will be inclined to the strictly vertical by several degrees as a result of the adjustment of the three-point lifting device or hitch of the operating tractor or other vehicle that has been discussed above, each of said elements will exert an upwardly directed force against the overlying layer of soil during part of its rotation around the axis of the corresponding shaft 2. The various layers of soil are thus broken up and mixed to some extent as well as being crumbled by the elements 12, 13 and 17 and the soil is left in a well aerated condition even when the soil concerned is basically of a heavy nature. Since each lowermost soil working element 17 comprises two symmetrically identical portions which are obliquely outwardly and downwardly inclined throughout their lengths from the common central portion, the soil working members 3 do not have much tendency to form a hard and compact plough sole, such a plough sole being a disadvantageous result of any cultivating operation since it inhibits capillary communication between the cultivated top soil and the underlying subsoil. The pairs of soil working elements 12 and the single soil working elements 13 and 17 project away from the axes of rotation of the corresponding soil working members 3 in opposite directions and an intensive cultivation of the soil can be produced by those elements without a correspondingly high consumption of power. The leading, with respect to the intended directions of operative rotation of the members 3, cutting edges of the elements 12, 13 and 17 will slice through the roots of weeds and any other unwanted plants that may be growing in the soil that is being cultivated, such roots usually being found substantially only in the top soil. This slicing action will kill most, if not all, of the weeds and other unwanted plants which will thus shrivel up and eventually augment the humus content of the soil. It is noted that the spacing between the upper elements 12 and central or middle elements 13 is greater than is the spacing between the latter elements and the lowermost elements 17. The soil is thus worked more intensively at the levels of the uppermost layers of subsoil and the boundary layers between the subsoil and top soil where, usually, the soil is in a harder condition than in the upper layers of more frequently cultivated and naturally weathered top soil.

FIGS. 4 and 5 of the drawings illustrate an alternative soil working member embodiment but parts that are similar, or identical, to parts that have already been described above are indicated, in FIGS. 4 and 5 of the drawings, by the same references as are employed in the earlier Figures. In the embodiment of FIGS. 4 and 5 of the drawings, the downwardly projecting externally splined end of each shaft 2 coaxially receives the upper sleeve-like end of a corresponding support or carrier 35, said support or carrier 35 forming part of a rotary soil working member that is generally indicated by the reference 35A and being formed, as in the case of each support or carrier 4, with an internal chamber 7 that allows said support or carrier 35 to be secured in its appointed position on the corresponding shaft 2. In this embodiment, the internal chamber 7 of each support or carrier 35 has a lower wall 36 whose axial thickness is equal to, or greater than, the thickness of at least part of the wall that extends around the corresponding chamber 7. Each rotary soil working member 35A is completed, beneath the lower wall 36 of the corresponding chamber 7, by an intermediate spacing piece 37, one of the single central or middle soil working elements 13, a lower spacing piece 38 and a single lower strip formation soil working element 39. The two spacing pieces 37 and 38 both have regular hexagonal cross-sections which are equal in area but it will be seen from FIG. 4 of the drawings that each lower spacing piece 38 is of significantly greater axial length than is each intermediate spacing piece 37. The sizes of the two pieces 37 and 38 of each soil working member 35A are such that an imaginary line perpendicularly joining two opposite parallel sides thereof has the same, or substantially the same, width as does the strip material from which the elements 12, 13 and 39 are formed, i.e., advantageously a width of substantially 60 millimeters (see FIG. 5). The lower wall 36 of each support or carrier 35 is formed at three locations which are spaced apart from one another at 120° intervals around the longitudinal axis (axis of rotation) of said support or carrier 35 with three internally screwthreaded holes. Each underlying assembly which comprises the two spacing pieces 37 and 38, the single soil working element 13 and the single soil working element 39 is firmly but releasably clamped together and in its appointed position by the heads of three bolts 40 whose shanks are entered upwardly through appropriately positioned holes in the central fastening portion of the lower element 39, registering holes in a central region of the single element 13 and registering bores in the spacing pieces 38 and 37, the screwthreaded shanks of said bolts 40 being received in the aforementioned screwthreaded holes that are formed in the lower wall 36 of the support or carrier 35 concerned. It will be appreciated that the single central or middle elements 13 in this embodiment are similar to the corresponding elements 13 of the preceding embodiment except inasmuch as each element 13 of the embodiment of FIGS. 4 and 5 of the drawings is formed with three holes for the reception of the three bolts 40 whereas, in the earlier embodiment, each element 13 has only a single central hole for co-operation with the corresponding bolt 18. The provision of three bolts 40 per soil working member 35A makes the provision of recesses and rims, such as the rims 14 and 15, unnecessary at the upper and lower ends of the spacing pieces 37 and 38.

The lower soil working element 39 of each soil working member 35A is similar to the previously described lower soil working elements 17 except that the strip material from which it is formed is bent back at the lowermost and outermost ends of the two symmetrical obliquely downwardly and outwardly inclined portions to form two further portions which are parallel or substantially parallel to the common central fastening portion and thus perpendicular or substantially perpendicular to the axis of rotation of the member 35A concerned. This construction effectively increases the working width of each element 39 as compared with the elements 17. All of the elements 12, 13 and 39 are made from resilient strip material which advantageously has a width of substantially 60 millimeters and a thickness of substantially 10 millimeters and at least the greater part of the leading edge of each element, with respect to the intended direction of operative rotation of the corresponding soil working member 35A, is bevelled to form a cutting edge. It can be seen from FIG. 5 of the drawings that, viewed in a direction parallel to the axis of rotation of one of the members 35A, the corresponding pair of elements 12 and single elements 13 and 39 project radially from the axis of rotation of said member 35A at regular intervals of 60° or substantially 60° around that axis. Successive soil working members 35A in the row thereof are again so arranged that, despite their considerable degree of overlap, elements which are at the same horizontal level will never foul one another when the implement is in use. When the implement is equipped with the soil working members 35A of FIGS. 4 and 5 of the drawings, rather than with the soil working members 3 which are illustrated in FIGS. 2 and 3 thereof, it operates in substantially the same manner as has been described above but produces a somewhat more intensive upwardly displacing and mixing action upon the soil at the level of the lowermost and outermost portions of the lower soil working elements 39.

FIGS. 5 and 6 of the drawings illustrate the provision of the implement with further alternative rotary soil working members 41. In this embodiment, the lowermost downwardly projecting end of each shaft that is equivalent to one of the previously mentioned shafts 2 is in the form of a stub shaft 42 that is formed with three internally screwthreaded holes which are all parallel to the longitudinal axis (axis of rotation) of the shaft concerned and which are spaced apart from one another at 120° intervals around that axis. Each such stub shaft 42 is of regular hexagonal cross-section and the internally screwthreaded holes which are formed therein receive the upper screwthreaded ends of three clamping bolts 43 whose heads maintain the member 41 in its assembled condition and in its appointed position. In the embodiment of FIGS. 6 and 7 of the drawings, the pairs of upper soil working elements 12 are replaced by single rectilinearly extending strip formation elements 44.

Each soil working member 41 also comprises a single central or middle soil working element 45 and a single lower soil working element 46 which, it will be noted, is identical to one of the elements 39 of the embodiment of FIGS. 4 and 5 of the drawings. It should also be noted that both the upper and central or middle elements 44 and 45 are identical to one another and to the single central or middle elements 13 of the embodiment of FIGS. 4 and 5 of the drawings, that is to say, each of the identical elements 44 and 45 is formed midway along its length with three holes through which are entered the shanks of the corresponding clamping bolts 43. Intermediate and lower spacing pieces 47 and 48 are interposed, in each soil working member 41, between the upper and central or middle elements 44 and 45 thereof and between the central or middle element 45 and the lower element 46 thereof, respectively. Both spacing pieces 47 and 48 have the same regular hexagonal cross-section as does the corresponding stub shaft 42 and both of them are formed with three longitudinally extending bores for the reception of the shanks of the clamping bolts 43. The two spacing pieces 47 and 48 of each member 41 are thus identical except as regards their axial lengths and, in contradistinction to the arrangement in the two preceding embodiments, the upper and central or middle element 44 and 45 are spaced apart from one another by the corresponding piece 47 by a shorter distance than are the central or middle element 45 and the lower element 46 by the spacing piece 48.

A soil cultivating implement equipped with the soil working members 41 of FIGS. 6 and 7 of the drawings can be used very effectively on land which has a hardened uppermost layer, such circumstances often being met with in fields where a crop has recently been harvested. If any of the soil working elements 13, 17, 39, 44, 45 or 46 should become bent or badly damaged or is worn, after long usage, to an extent which reduces its effectiveness to below an ecceptable minimum, it is only necessary temporarily to remove the bolt 18 or bolts 40 or 43 concerned to enable the defective element or elements quickly and easily to be replaced. Substantially the same can be said in respect of the pairs of upper elements 12 in the embodiments of FIGS. 1 to 5 of the drawings since each such element 12 requires only the temporary removal of two of the bolts 11 to enable it to be replaced. Since all of the elements are capable of a very simple formation from resilient strip material, their replacement, when required, is an inexpensive matter.

Although certain features of the soil cultivating implement and soil working members that have been described and/or that are illustrated in the accompanying drawings will be set forth in the following claims as inventive features, it is emphasised that the invention is not necessarily limited to those features and that it includes within its scope each of the parts of the soil cultivating implement and of the soil working member embodiments that has been described, and/or that is illustrated in the accompanying drawings, both individually and in various combinations.

What we claim is:

1. A soil cultivating implement comprising at least one soil working member that is rotatable about an upwardly extending axis and driving means connected to rotate said member, said member comprising an upwardly extending carrier and at least three elongate soil working elements interconnected to the carrier intermediate the ends of said elements, said elements being arranged one above the other and the spacing between said elements decreasing when viewed downwardly and along said axis of rotation, the lowermost soil working element having a portion extending obliquely downwardly and said portion merging into a further portion which extends substantially perpendicular to said axis.

2. An implement as claimed in claim 1, wherein said first mentioned portion is connected to said carrier and said carrier defines the axis of rotation of said member.

3. An implement as claimed in claim 2, wherein said elements are separated by spacing pieces and each piece is polygonal in cross-section.

4. An implement as claimed in claim 3, wherein each spacing piece has two opposite sides with rims and said rims interfit with said elements to prevent angular displacements thereof relative to said spacing pieces.

5. An implement as claimed in claim 4, wherein the rims of two neighboring spacing pieces embrace the edges of one element between said two pieces.

6. An implement as claimed in claim 1, wherein said carrier comprises spacing means between said elements, said spacing means including rims at opposite sides of the carrier and said rims interfitting with at least one of said elements.

* * * * *